Figure 1:
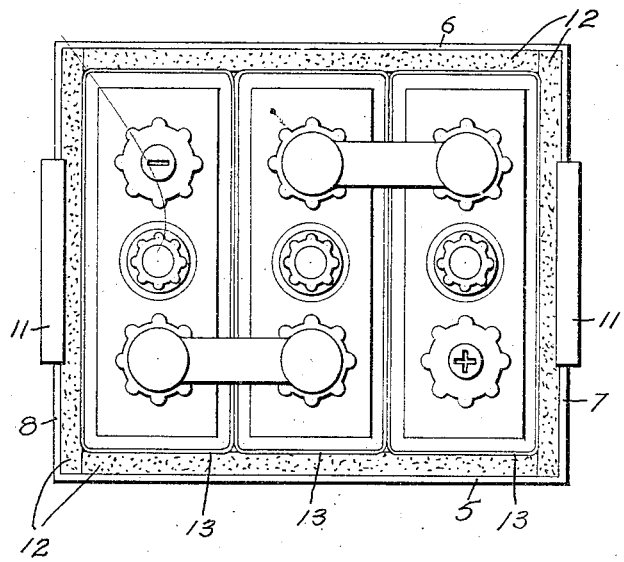

March 4, 1924. 1,485,438

H. E. SPOENEMAN ET AL

STORAGE BATTERY BOX

Filed April 18, 1921

INVENTORS
HARRY E. SPOENEMAN
CARL G. SCHWARZ
BY Edward E. Lingan
ATT'Y

Patented Mar. 4, 1924.

1,485,438

UNITED STATES PATENT OFFICE.

HARRY E. SPOENEMAN AND CARL G. SCHWARZ, OF ST. LOUIS, MISSOURI, ASSIGNORS TO PANAMA RUBBER AND EQUIPMENT CO., OF ST. LOUIS, MISSOURI, A CORPORATION OF MISSOURI.

STORAGE-BATTERY BOX.

Application filed April 18, 1921. Serial 462,198.

*To all whom it may concern:*

Be it known that we, HARRY E. SPOENEMAN and CARL G. SCHWARZ, citizens of the United States, and residents of the city of St. Louis and State of Missouri, have invented certain new and useful Improvements in Storage-Battery Boxes, of which the following is a specification containing a full, clear, and exact description, reference being had to the accompanying drawings, forming a part hereof.

Our invention relates to improvements in storage battery boxes and has for its primary object a storage battery box constructed of acid proof metal for containing the battery cells.

A further object is to construct a storage battery box of acid proof metal and line the same on its sides and bottom with removable sheets of resilient acid proof and non-deteriorating material which eliminates breakage of battery jars due to road shocks and the like.

In the drawings,

Fig. 1 is a top plan view of our improved box with the jars located therein.

Figure 2:
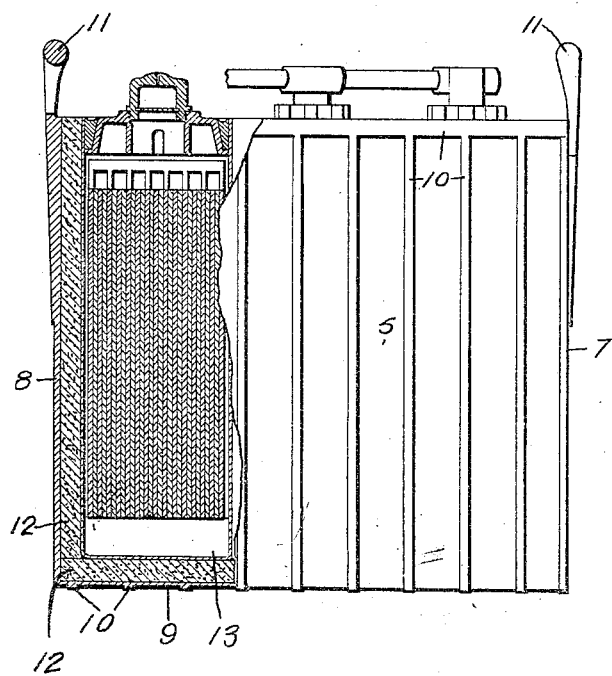

Fig. 2 a side elevation with portions broken away and in section.

Figure 3:
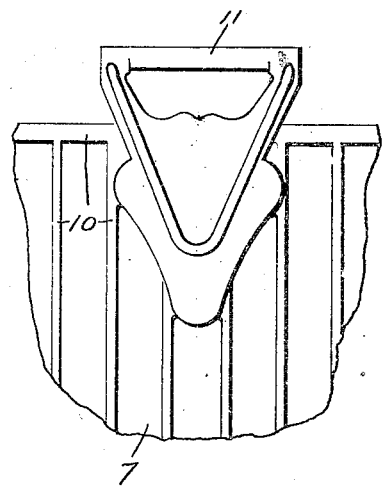

Fig. 3 a fragmental end view of the same, showing one of the handles.

Figure 4:
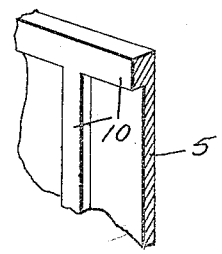

Fig. 4 a fragmental perspective of the box, showing the reinforcing ribs.

In the construction of our box we employ a box having side walls 5 and 6, end walls 7 and 8 and a bottom 9. This box is made of acid resisting metal such as lead or the like and is provided with stiffening ribs 10. The ends 7 and 8 are also provided with handles 11. These handles may be formed either integral with the box or may be secured thereto by any suitable means, such as riveting or burning on. Our box may also be molded in one piece or made in several parts and then assembled and burned together so that the sides and bottom will be practically integral. Placed on the four sides and the bottom are removable sheets of relatively thick resilient material 12. These sheets are formed of a composition of vegetable oil magnesia and sulphur chloride and are acid resisting and resilient. These sheets are for the purpose of preventing the jars within the box from breaking, and are of material which is non-deteriorating or crystallizing and does not harden with age, but always remains resilient. It will be noted, from Fig. 1 that when the battery jars 13 are placed in position, this resilient material is slightly compressed, thus holding the jars against movement. When the battery is used in an automobile by the use of our construction it is not necessary to secure the jars within the box by the use of pitch as at present where wooden boxes are used. The resilient lining of the box acts as a shock absorber for the jars and prolongs their life as well as lessening the shock imparted to the battery plates contained in these jars. This also lessens the tendency of the terminals which project through the cover of the jar from working loose and allowing the electrolyte to splash up on top of the jars. Our box is preferably constructed of lead, although any other acid proof metal will answer the purpose. Our box not only protects the jars, but has an additional function of protecting the holder in which the box is placed. It has been found that where wooden boxes are used, these boxes are coated with an acid proof paint, but in the event of the breakage of the jar, the acid will seep into the cracks and not only destroy the box, but also attack the metal container in which the box is located, or if placed on the floor of an automobile under the seat, will attack the body of the machine.

The method of lining our box is as follows—

After the box is completed, a sheet of resilient material is placed on the bottom. This sheet is exactly the same size as the interior of the box so that it will fit snugly therein. Two sheets are then placed in the box, one at each end. These sheets contact with the sides of the box and rest on the sheet in the bottom. Finally a sheet of material is placed along each side of the box. These sheets are of such a length as to contact with the sheets placed against the ends of the box and also rest on the bottom sheet. The upper ends of the last four mentioned sheets terminate flush with the upper edge of the box. The sheets are of such a size as to fit tightly against each other when in position. This holds them in position and prevents them from falling down before the battery jars are inserted, and as previously stated the battery jars when inserted exert a pressure on the sheets of material so that the resiliency of these sheets will hold the jars securely in position.

Having fully described our invention what we claim is:

1. A storage battery box comprising an integrally formed acid resisting metallic box, a sheet of acid resisting resilient material located inside said box and on its bottom, a sheet of acid resisting resilient material placed at each end of the box, said sheets resting on the first mentioned sheet and extending from side to side, and a sheet of resilient acid resisting material located on each side of the box, said sheets resting on the bottom sheet and contacting with the end sheets.

2. A storage battery box comprising an integrally formed acid resisting metallic box, a sheet of acid resisting resilient material located inside said box and on its bottom, a sheet of acid resisting resilient material placed at each end of the box, said sheets resting on the first mentioned sheet and extending from side to side, and a sheet of resilient acid resisting material located on each side of the box, said sheets resting on the bottom sheet and contacting with the end sheets, and a plurality of cells located within the box and contacting with the sheets of resilient material whereby said cells and sheets are firmly held within the box without the use of any extraneous securing means.

3. The storage battery box of claim 1 in which the resilient acid resisting sheets are formed of a composition of vegetable oil, magnesia and sulphur chloride.

In testimony whereof, we have signed our names to this specification.

HARRY E. SPOENEMAN.
CARL G. SCHWARZ.